United States Patent
Ignatyev

(10) Patent No.: US 10,747,756 B2
(45) Date of Patent: Aug. 18, 2020

(54) RECOMMENDING FIELDS FOR A QUERY BASED ON PRIOR QUERIES

(71) Applicant: Oracle International Corporation, Redwood Shores, CA (US)

(72) Inventor: Oleksiy Ignatyev, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 91 days.

(21) Appl. No.: 15/719,254

(22) Filed: Sep. 28, 2017

(65) Prior Publication Data

US 2019/0095482 A1   Mar. 28, 2019

(51) Int. Cl.
*G06F 16/00*    (2019.01)
*G06F 16/242*   (2019.01)
*G06F 16/2455*  (2019.01)
*G06F 16/2457*  (2019.01)

(52) U.S. Cl.
CPC ...... *G06F 16/2428* (2019.01); *G06F 16/2455* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 6,006,225 A * | 12/1999 | Bowman | G06F 16/3325 |
| 6,716,032 B2 | 4/2004 | Reisz et al. | |
| 7,225,197 B2 | 5/2007 | Lissar et al. | |
| 7,617,209 B2 | 11/2009 | Whitman et al. | |
| 8,321,402 B2 | 11/2012 | Reeb | |
| 8,849,840 B2 | 9/2014 | Zaydman et al. | |
| 8,972,899 B2 | 3/2015 | Carlsson et al. | |
| 9,081,852 B2 * | 7/2015 | Marvit | G06F 16/3338 |
| 9,262,512 B2 | 2/2016 | Chang et al. | |
| 2005/0210020 A1 * | 9/2005 | Gunn | G06F 3/0236 |
| 2012/0284293 A1 * | 11/2012 | Nierenberg | G06F 16/3329 707/766 |
| 2015/0100562 A1 * | 4/2015 | Kohlmeier | G06F 16/332 707/706 |
| 2016/0092601 A1 * | 3/2016 | Lamas | G06F 16/25 707/722 |
| 2016/0371288 A1 | 12/2016 | Le Biannic et al. | |

OTHER PUBLICATIONS

John-Pierre Cornelissen, "A REAL Advanced Search Feature—Search by Multiple Fields." Salesforce. https://success.salesforce.com/ideaview?id=08730000000BrrqAAC. 2007. pp. 1-14.
Rajani Maski, "Using Apache Solr for Ecommerce Search Applications." Happiest Minds. http://www.happiestminds.com/whitepapers/using-apache-solr-for-ecommerce-search-applications.pdf. 2013. pp. 1-12.

\* cited by examiner

*Primary Examiner* — Son T Hoang
(74) *Attorney, Agent, or Firm* — Invoke

(57) ABSTRACT

The system receives user-selected fields from a set of candidate fields. Based on the user-selected fields, the system recommends at least one candidate field from the set of candidate fields. The system may select the at least one candidate field for recommendation based, at least in part, on a set of one or more prior queries. Responsive to receiving a user selection of a recommended candidate field, the system adds the recommended candidate field to the set of user-selected fields to obtain an updated set of user-selected fields. The system executes the query based on the updated set of user-selected fields.

22 Claims, 8 Drawing Sheets

300

| Saved Amortization Schedules Search |
| --- |
| Save | ▼ | Reset | Cancel | Preview | Pivot Report | Actions ▾ |
| SEARCH TITLE* |
| Custom Amortization Schedules Search |
| ID |
| ☐ PUBLIC |
| ☐ AVAILABLE AS LIST VIEW |
| Criteria  Results  Highlighting  Available Filters  Audience  Roles  Email  Audit Trail  Execution Log  Search Title Translation |
| Use this tab to specify criteria that narrow down your search |
| ☐ USE EXPRESSIONS |
| Standard  Summary |
| Filter*                                         DESCRIPTION*              FORMULA |

AMOUNT
DATE
DESIGNATION ACCOUNT
ELIMINATE
EXTERNAL ID
EXTERNAL ID (TEST)

Remove
Preview | Pivot Report | Actions▾

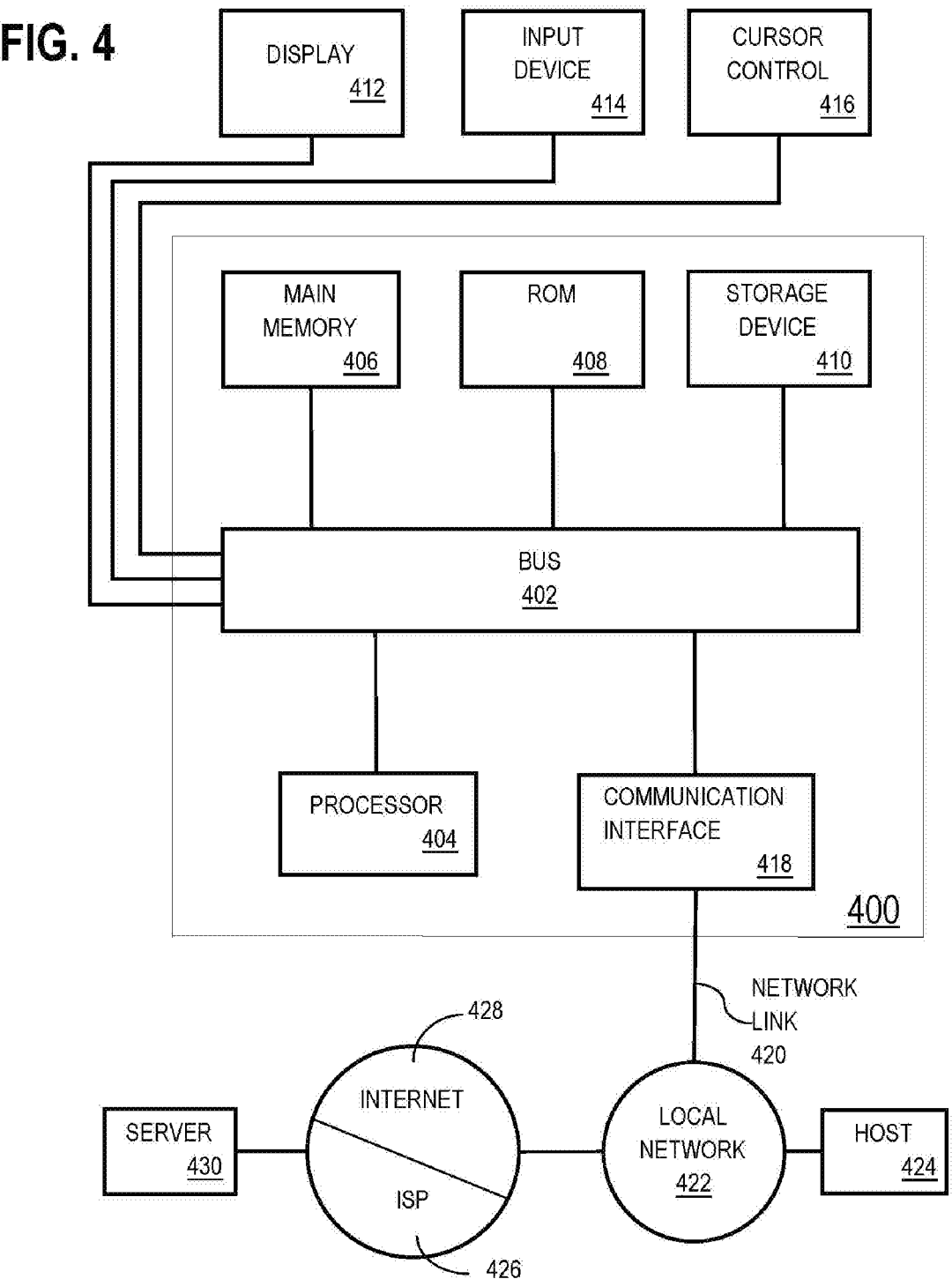

RECOMMENDING FIELDS FOR A QUERY BASED ON PRIOR QUERIES

TECHNICAL FIELD

The present disclosure relates to recommending fields for use in a query, based on prior queries.

BACKGROUND

Organizations commonly store and analyze large amounts of data. Data may be stored in a relational database. A relational database stores data in one or more tables. The data may be stored in association with data fields (also referred to as fields). As an example, a data table includes the data fields FirstName and LastName. Thousands of first names and last names may be stored in association with the data fields FirstName and LastName, respectively.

The data may be searched, filtered, and/or complied into reports. A user may formulate a query to retrieve a subset of data from the database. Formulating a query may involve selecting a set of data fields or records for use in formulating the query. The number of data fields available for selection may be very large, making the process of searching for pertinent data fields a potentially time-consuming process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3E illustrate examples of user interfaces with estimated query fields; and FIG. 4 illustrates a block diagram of a system in accordance with one or more embodiments.

DETAILED DESCRIPTION

Figure 1:
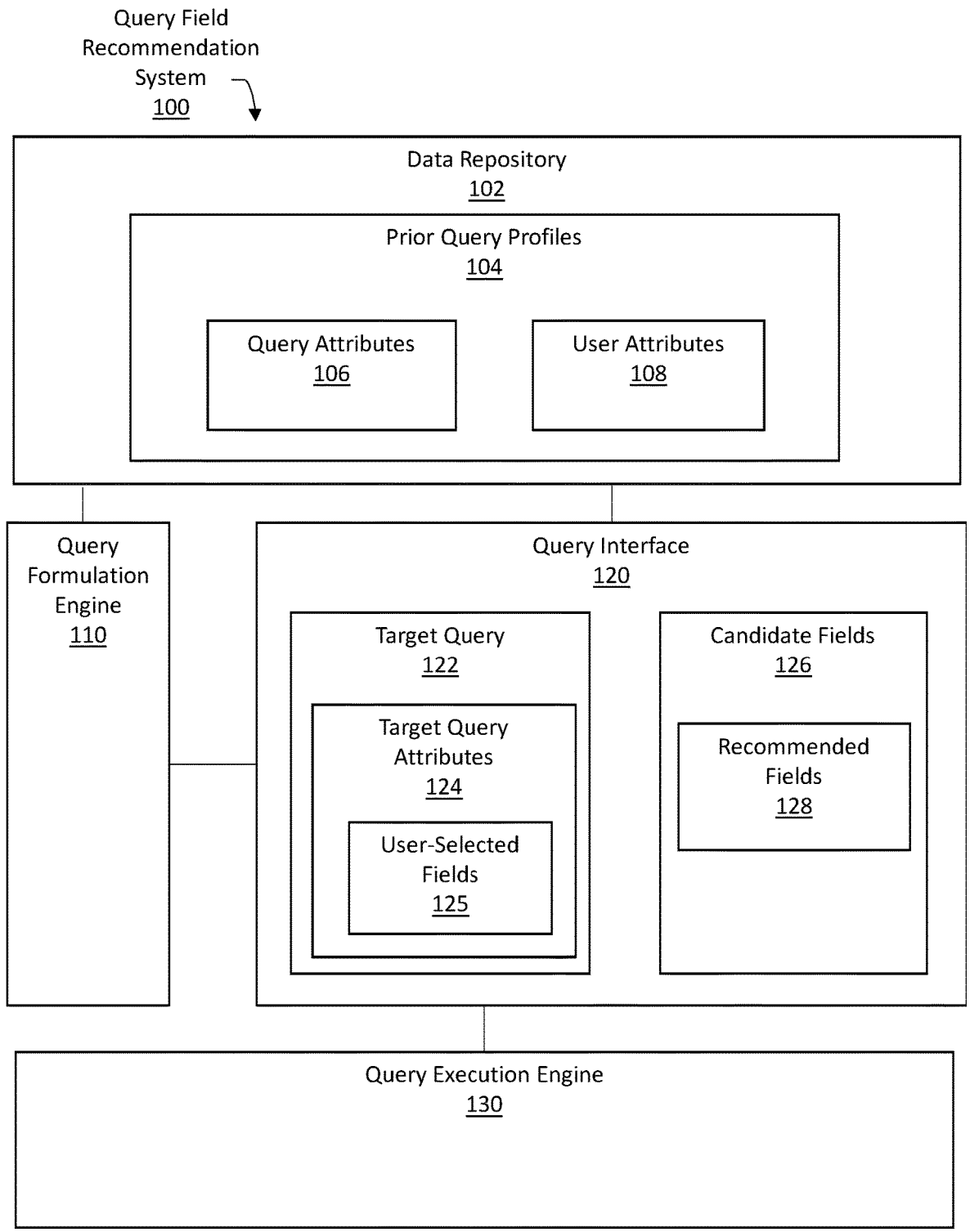
FIG. 1 illustrates a system for recommending query fields in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. QUERY FIELD RECOMMENDATION SYSTEM
3. RECOMMENDING FIELDS FOR FORMULATING A QUERY
4. FIELD SELECTION ALGORITHM
   A. FIELD SELECTION BASED ON RANKING SCORE
   B. FIELD SELECTION BASED ON TEMPORARY TABLE
   C. FIELD SELECTION BASED ON FILTERED PRIOR QUERY PROFILES
5. QUERY INTERFACE
6. MISCELLANEOUS; EXTENSIONS
7. HARDWARE OVERVIEW

1. General Overview

One or more embodiments include recommending fields for formulating a query. The system presents a set of candidate fields which may be selected by a user for formulating a query. The system receives an initial set of user-selected fields from the set of candidate fields. Based at least on the initial set of user-selected fields, the system recommends at least one additional field from the set of candidate fields. If the user selects a recommended field, the system adds the recommended field to the initial set of user-selected fields to obtain an updated set of user-selected fields. The system then executes the updated query with the updated set of user-selected fields.

A candidate field may be recommended based on (a) an initial set of user-selected fields of a query currently being formulated and (b) historical data describing prior queries. Historical data may indicate the sets of fields selected for various prior queries. Historical data may further indicate, for each query (defined by a corresponding set of fields), a number of prior executions and/or a time of prior executions. The historical data, used for determining field recommendations, may include information for all prior queries or a subset of prior queries which share attributes with the current query. The system uses historical data to compute a correlation for any field x in relation to an initial set of user-selected fields. The correlation for any field x in relation to an initial set of user-selected fields is based, for example, on how often field x and the initial set of user-selected fields were previously included in a same query. The correlation for any field x in relation to initial set of user-selected fields may be further based on a recency of the queries which include both field x and the initial set of user-selected fields. When an initial set of one or more user-selected fields has been received, the system may determine the correlation of various non-selected candidate fields to the initial set of user-selected fields. A candidate field, from the non-selected candidate fields, may be recommended based the correlation between that candidate field and the initial set of user-selected fields.

As an example, a user initially selects the fields Quotas and Sales for formulating a query. Fields Quotas and Sales are thus included in an initial set of user-selected fields. Historically, a large number of queries with the fields Quotas and Sales have also included the field Revenue. As a result, the usage correlation value between Revenue and the set of fields including Quotas and Sales is above a threshold value. Responsive to determining that the usage correlation for Revenue in relation to the initial set of user-selected fields is above the threshold value, the system recommends the field Revenue for further formulating the query. If the user selects the recommended candidate field Revenue, the system adds the recommended field Revenue to the initial set of user-selected fields to obtain an updated set of user-selected fields including Quotas, Sales, and Revenue. Responsive to a command requesting execution, the system may the execute the updated query with the updated set of user-selected fields including Quotas, Sales, and Revenue.

In one or more embodiments, recommending fields includes presenting the recommended fields in a different manner or a different section than the non-recommended fields. As an example, recommended fields may be presented in a drop-down menu designated only for recommended fields. As another example, recommended fields may be presented in a recommended field interface section from which the user can drag and drop fields to a query formulation section. As another example, recommended fields may be presented by highlighting or prioritizing the recommended fields in the list of candidate fields. The recommended fields may be ranked higher than the non-recommended fields in a list of candidate fields.

By recommending fields for formulating a query, the system may shorten the otherwise time-consuming process of a user selecting fields, from a list of candidate fields, for formulating a query.

One or more embodiments described in this Specification or recited in the claims may not be included in this General Overview section.

2. Query Field Recommendation System

FIG. 1 illustrates a query field recommendation system 100 in accordance with one or more embodiments. The query field recommendation system 100 is a system for recommending fields for formulating a query. As illustrated in FIG. 1, the query field recommendation system 100 includes a query interface 120, a query formulation engine 110, a data repository 102, and a query execution engine 130. In one or more embodiments, the query field recommendation system 100 may include more components or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the data repository 102 is any type of storage unit and/or device (e.g., a file system, database, collection of tables, or any other storage mechanism) for storing data. Further, data repository 102 may include multiple different storage units and/or devices. The multiple different storage units and/or devices may or may not be of the same type or located at the same physical site. Further, data repository 102 may be implemented or may execute on the same computing system as the query formulation engine 110, query interface 120, and query execution engine 130. Alternatively, or additionally, a data repository 102 may be implemented or executed on a computing system separate from the query formulation engine 110, query interface 120, and query execution engine 130. The data repository 102 may be communicatively coupled to the query formulation engine 110, query interface 120, and query execution engine 130 via a direct connection or via a network.

In an embodiment, the data repository 102 stores prior query profiles 104. Prior query profiles 104 include data corresponding to prior queries. Prior queries are queries which have been previously formulated and/or executed. Prior query profiles 104 may include query attributes 106 and user attributes 108, as described below. Information describing prior queries may be implemented across any of components within the query field recommendation system 100. However, this information is illustrated within the data repository 102 for purposes of clarity and explanation.

In an embodiment, query attributes 106 characterize one or more prior queries. A query attribute 106 may be a user-specified query definition element. As an example, a query attribute 106 is a field that was requested in a prior query. As another example, a query attribute 106 is a number of fields requested in a prior query. Alternatively, or additionally, a query attribute 106 may relate to a context of a prior query. As an example, a query attribute 106 may be the time of year when a query was executed. As another example, a query attribute 106 may be an industry associated with a query (e.g., sales or education). As another example, a query attribute 106 may specify a software type associated with the query. One query may be configured via Customer Relationship Management (CRM) software, while a second query is configured via Human Capital Management (HCM) software.

In an embodiment, user attributes 108 are attributes of a user associated with a prior query. A user attribute 108 may describe the user that formulated a particular query. A user attribute 108 may be the name of the user that formulated the query. A user attribute 108 may be a role of the user. As examples, the role of a user may be salesman, manager, or Chief Executive Officer (CEO). Additional user attributes 108 may include the age of the user and the length of time the user has worked at a company.

In an embodiment, a target query 122 is a query currently being formulated. A target query 122 may be formulated by a user for immediate execution. Alternatively, or additionally, a target query 122 may be formulated and saved for execution at a later time. A target query may be formulated by a user via the query interface 120.

In an embodiment, the query interface 120 is a user interface (UI), such as a graphical user interface (GUI). The query interface may present components for formulating a query. The query interface 120 may include components such as text boxes, radio buttons, and drop-down menus. The query interface 120 may accept user-specified and/or user-selected elements for defining a query 122.

Target query attributes 124 characterize the target query 122. The target query attributes 124 are similar to the query attributes 106 and user attributes 108, described above. The target query attributes 124 may further include characteristics of the user, such as a job role. The target query attributes 124 may further include characteristics of the target query, such as a time of year in which the query is being formulated. Target query attributes include the user-selected fields 125.

The user-selected fields 125 include user-specified and/or user-selected elements which define the target query 122. The user-selected fields 125 are fields selected for use in formulating the target query. As an example, a system receives a user selection of a field Cost from a candidate set of fields Item, Cost, and Order Number. Cost is a user-selected field 125. A user-selected field 125 may also include a field selected by a user in response to a recommendation by the system. The user-selected fields 125 may include a set of fields corresponding to a set of tables in a database.

The query interface may display the user-selected fields 125. As an example, the query interface 120 may display, in a box labeled "Query Fields," a list of fields to be included in the target query. The user-selected fields 125 may be used to execute a query. The system may locate data associated with one or more user-selected fields. The system may display data associated with one or more user-selected fields.

In an embodiment, the candidate fields 126 includes fields that may be used for formulating a query. The candidate fields 126 may include a set of fields corresponding to a set of tables in a database. The candidate fields 126 may include all available fields. Alternatively, or additionally, the candidate fields 126 may be filtered based on target query attributes such as industry. As an example, for a query related to amortization, the candidate fields 126 may include Amount, Date, and Destination Account.

In an embodiment, the recommended fields 128 are fields that the system has selected to recommend to the user, for use in formulating the target query. The system may select the recommended fields 128 from the candidate fields 126 based on the stored prior query profiles 104 and/or user-selected fields 125. The system may analyze prior query profiles 104 that include the user-selected fields 125 to identify candidate fields 126 for recommendation.

The recommended fields 128 may be displayed in a separate area from non-recommended candidate fields. Alternatively, or additionally, the recommended fields 128 may be displayed in a prioritized manner (i.e., highlighted or ranked above non-recommended candidate fields).

In one or more embodiments, the query formulation engine 110 includes hardware and/or software components for selecting fields for recommending to a user. The query formulation engine 110 may include functionality to parse information associated with a target query 122. The query formulation engine 110 may include functionality to identify target query attributes 124 of the target query 122.

The query formulation engine 110 may include functionality to compare a set of candidate fields 126 to prior query profiles 104. Based on the comparison, the query formulation engine may select candidate fields for recommendation. Alternatively, or additionally, the query formulation engine 110 may select candidate fields for recommendation based on a stored mapping associating fields. The query formulation engine 110 may transmit a set of selected candidate fields to the query interface 120 for recommendation.

The query formulation engine 110 may include functionality to formulate a query based on the user-selected fields. The query formulation engine may structure a query interpretable by the query execution engine using the user-selected fields and additional parameters specified by the user via the query interface. As an example, the user may select "filter by" from a drop-down menu, followed by the field Name, followed by the text string "starts with A." Based on the received user input, the query formulation engine formulates a Structured Query Language (SQL) query to identify the names, stored to a table, which start with the letter A.

In an embodiment, the query execution engine 130 includes hardware and/or software configured to execute a query. The query execution engine 130 may execute the query by transmitting requests to one or more databases. The query execution engine may execute computations to execute a query. For example, the query execution engine may sum data, average data, and combine tables in whole or in part. The query execution engine may retrieve query results from one or more databases. The query execution engine 130 may cause query results to be displayed via the query interface 120.

3. Recommending Fields for Formulating a Query

Figure 2:
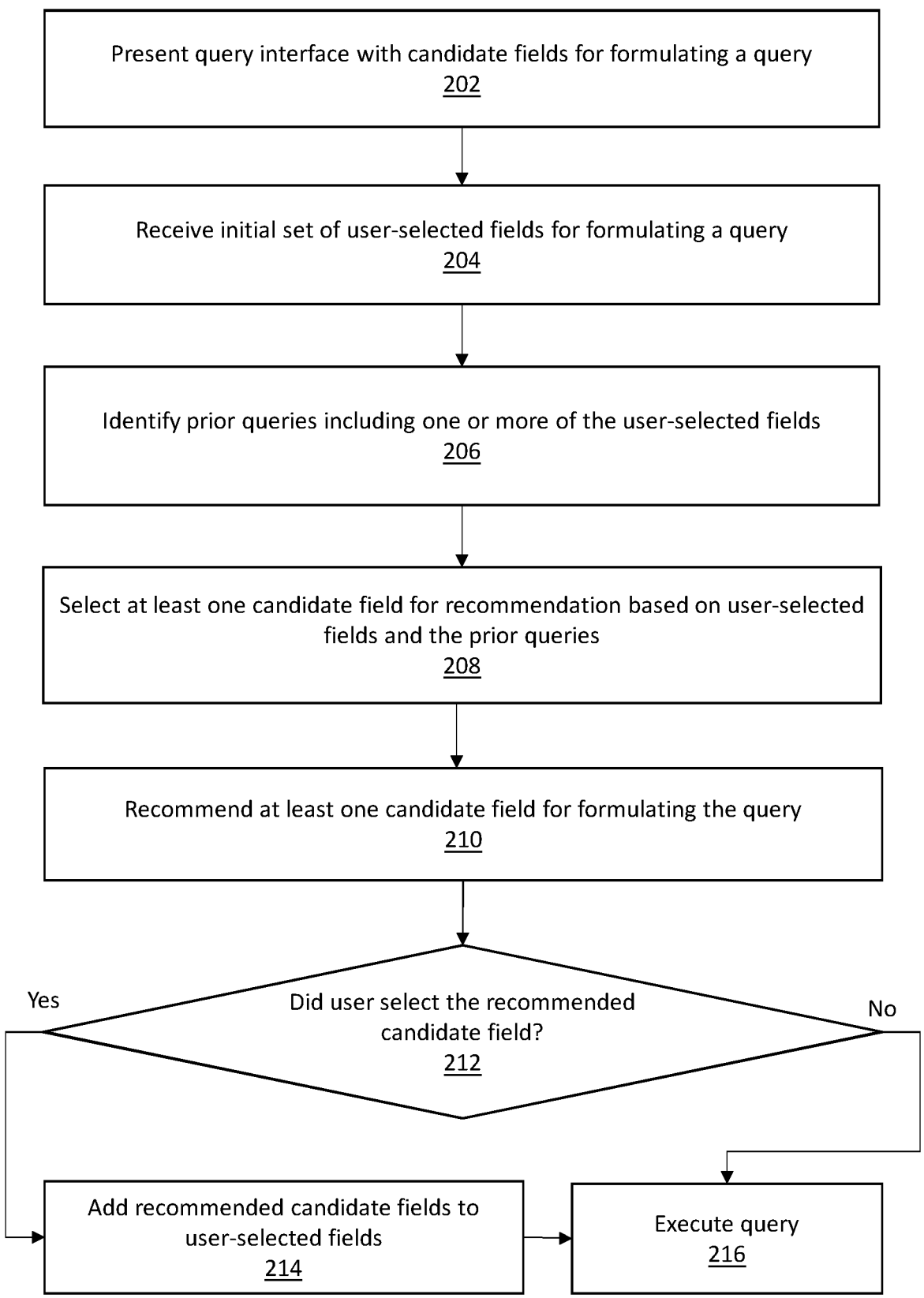
FIG. 2 illustrates an example set of operations for recommending query fields in accordance with one or more embodiments.

FIG. 2 illustrates an example set of operations for recommending fields for formulating a query, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In one or more embodiments, the query field recommendation system presents a query interface (Operation 202). The query interface may be presented responsive to receiving a request, from a user, to formulate a query. The query interface may be rendered with elements for receiving user input to formulate a query. As described in Section 2, the query interface may display a set of candidate fields to the user. The query interface may allow a user to select fields, from the set of candidate fields, for formulating the query.

In an embodiment, the query interface may display information to help a user to select a candidate field. When a user hovers over a particular candidate field, the query interface may present text describing the particular candidate field. Text describing a candidate field is particularly useful when the name of the field does not clearly indicate what data is stored in association with the field. As an example, the candidate field Bonus represents the total sales revenue associated with a particular sales representative divided by the number of sales calls made by the sales representative. When a user views the list of candidate fields, the user is unsure what data is stored in association with the Bonus field. When the user moves a mouse pointer over the Bonus field, the query interface displays a pop-up including the text "sales rep revenue divided by sales rep sales calls." Based on the displayed information, the user can make an informed decision whether to select the Bonus field for formulating the target query.

In an embodiment, the query interface receives an initial set of user-selected fields, from the candidate fields, for formulating a query (Operation 204). The query interface may receive the initial set of user-selected fields via user interaction with the displayed candidate fields. As an example, the query interface displays a list of candidate fields including Date, Amount, Customer Name, and Customer ID. The query interface receives a signal indicating that the user has double-clicked on the candidate fields Date and Customer ID. Accordingly, the query interface recognizes Date and Customer ID as the user-selected fields for formulating the query.

In an embodiment, the query formulation engine identifies one or more prior queries which include one or more of the user-selected fields (Operation 206). The query formulation engine may search the data repository to identify prior query profiles which include one or more of the user-selected fields. As an example, based on the user-selected fields Date and Customer ID, the query formulation engine searches the data repository for stored prior query profiles that include the fields Date, Customer ID, or both Date and Customer ID.

In an embodiment, the prior queries including one or more of the user-selected fields may be selected from a subset of prior queries which share attribute(s) with the current query (also referred to herein as a target query). The subset of prior queries may include, for example, queries (a) by a same user as the current query, (a) by a user with a same role as a current query's user, (c) with a same time period in a year as the current query, or (d) associated with a same industry as the current query.

In an embodiment, the query formulation engine selects at least one candidate field for recommendation based on initial set of the user-selected fields and prior queries (Operation 208). The query formulation engine may use an algorithm, as described in Section 4, to select the candidate field(s) for recommendation. The query formulation engine may recommend fields that (a) are not included in the initial set of user-selected fields for the current query and (b) are included in prior queries with the initial set of user-selected fields.

The query formulation engine may recommend a candidate field based on a correlation, in prior queries, between the candidate field and the initial set of user-selected fields. The query formulation engine may select a particular candidate field based on a number of prior query profiles which include both the particular candidate field and one or more of the user-selected fields. The query formulation engine may assign a ranking score to candidate fields. The system may compute the ranking score based on shared attributes between the target query and the prior query.

In an embodiment, the query formulation engine selects the candidate field(s) for recommendation based on user attributes. The query formulation engine may select a candidate field for recommendation fields if a same user formulated both the prior query and the target query. The query formulation engine may select a candidate field for recommendation if both the prior query and the target query were formulated by a user with the same role. As an example, the query formulation engine identifies two prior queries, $Q_1$ and $Q_2$, that include the user-selected fields Game and User. The query formulation engine determines that the target query was formulated by a developer. The query formulation engine determines that prior query $Q_1$ was formulated by a developer. The query formulation engine determines that prior query $Q_2$ was formulated by a sales representative. Based on the user roles, the query formulation engine selects, for recommendation, three candidate fields included in $Q_1$.

In an embodiment, the query formulation engine selects the candidate field(s) for recommendation based on prior query attributes. As an example, the query formulation engine may select a subset of prior queries for further analysis based on an industry associated with the query. The target query is related to the education industry. Accordingly, the query formulation engine selects five hundred prior query profiles that are related to education. The query formulation engine selects, for recommendation, four fields that were included most frequently in the five hundred prior query profiles related to education.

In an embodiment, the query formulation engine selects the candidate field(s) for recommendation based on an update time of the candidate field(s). The query formulation engine may query the database to determine a time at which each candidate field was updated. The query formulation engine may increment the ranking of a candidate field if the candidate field was updated within a predetermined time interval. As examples, the predetermined time interval may be a day, week, or month prior to the time the target query is being formulated.

Alternatively, or additionally, the query formulation engine may select the candidate field(s) for recommendation based on a stored mapping between the user-selected fields and the candidate fields. As an example, queries to a database of student information which include the field Student have previously included the field Grades 80% of the time. Based on the correlation between the fields Student and Grades, the query formulation engine is hard-coded to select the candidate field Grades for recommendation if the user has selected the field Student.

In an embodiment, the query field recommendation system recommends the at least one candidate field for formulating the query (Operation 210). The system may display, concurrently with or on the query interface, the recommended fields. Recommending candidate fields may include presenting the recommended candidate fields in a different manner or a different section of the query interface than the non-recommended candidate fields In an embodiment, the system recommends candidate fields by presenting the recommended candidate fields in a separate portion of the query interface than the portion in which other candidate fields are presented. As an example, recommended candidate fields may be presented in a drop-down menu designated for recommended candidate fields. As another example, recommended candidate fields may be presented in a recommended field interface section from which the user can drag and drop candidate fields.

In an embodiment, the system recommends candidate fields by presenting the recommended fields in a different color than the other candidate fields. As an example, recommended candidate fields may be highlighted in yellow, while other candidate fields are not highlighted. As another example, the recommended candidate fields may be displayed in a green font, while the other candidate fields are displayed in a black font.

In an embodiment, the system recommends candidate fields by prioritizing the recommended candidate fields in the list of candidate fields. As an example, the recommended candidate fields are displayed in a prioritized position at the top of a list of candidate fields.

In an embodiment, the system determines whether the user has selected the recommended candidate field(s) (Operation 212). The system may detect that a user has selected one or more of the recommended candidate fields responsive to detecting user interaction with the query interface. As an example, the system may detect that the user double-clicked on a field to select the field. As another example, the system may detect that a user selected a field by dragging a recommended field from a recommended field area of the query interface to a selected field area of the query interface.

In an embodiment, the system adds the recommended candidate fields, selected by the user, to the user-selected fields (Operation 214). The system may append the user-selected recommended fields to a list of user-selected fields to generate an updated list of user-selected fields. The system may display the updated list of user-selected fields via the query interface.

In an embodiment, if the user did not select the recommended candidate field(s), then the system may refrain from adding the candidate field(s) to the user-selected fields. Further, the system may refrain from recommending the candidate field(s) which were not user-selected. As an example, the system recommends the fields Student and Grades by presenting the fields at the top of a list of candidate fields. The user selects the field Student, and does not select the field Grades, for formulating the query. The system adds Student to the set of user-selected fields. The system removes Grades from the list of candidate fields from which the user may select additional fields for formulating the query. Alternatively, the system may include the non-user-selected fields in the list of candidate fields, but display the non-user selected fields at the bottom of the list.

The system may continue to execute operations 204-214 as the user enters additional fields. The system may remain in a query-formulating state until receiving instructions to complete formulation of the query. As an example, the query interface may include a button labeled "Done." Upon detecting user interaction with the button, the system prepares to execute the query.

The system may prepare to execute a query by formulating a query in a particular format. As an example, the system may use stored templates based on SQL query syntax to formulate a SQL query including the user-selected fields. The system may combine query syntax, user-selected fields, and user-selected parameters to formulate a query. As an example, a user selects, via the query interface, the fields Amount and User ID. The user enters, via the query interface, the parameter ">1,000." The system formulates the SQL query, "SELECT User ID, Amount FROM Purchase Data WHERE Amount>1,000," based on the user input.

In an embodiment, the query execution engine executes the query (Operation 216). The query execution engine may execute the query by retrieving data from a database, executing operations on data, and/or causing display of query results. For example, the query execution engine may execute a query by retrieving data from three data fields in one table, and retrieving data from two data fields in another table. The query execution engine then merges the data fields into one new table. The system displays the new table via the query interface. Alternatively, the system may display the output of the query elsewhere, such as by exporting the query output table to an Excel spreadsheet.

The following detailed example illustrates operations in accordance with one or more embodiments. The following detailed example should not be construed as limiting the scope of any of the claims. The system receives a request, from a user, to formulate a new query. The system displays the query interface. The query interface includes a drop-down menu which displays 100 candidate fields, from which the user can select a set of user-selected fields for formulating the target query.

The system receives an initial user-selected field, User ID, via user selection of User ID from the drop-down menu of candidate fields. The system identifies forty prior queries including the field User ID. The system assigns a ranking to each field comprised in the forty prior queries, based on a recency of update of the field. Based on the rankings, the system selects the three most recently updated fields that were included in prior queries with the field User ID. The three selected fields are Company, Amount, and Date.

The system recommends the fields Company, Amount, and Date by presenting the recommended fields in a recommended field section of the query interface. The system determines that the user has selected the recommended field Company. The system further determines that the user has not selected the recommended fields Amount and Date.

The system identifies five prior queries that include both the field User ID and the field Company. The system assigns rankings to the candidate fields included in the five prior queries, based on a recency of update of each of the candidate fields. Based on the rankings, the system selects the three most recently-updated candidate fields. The fields selected for recommendation are Altitude, User Name, and Sales Coefficient.

The system recommends the selected fields by presenting Altitude, User Name, and Sales Coefficient in the recommended field section of the query interface. The system removes the non-user-selected fields Amount and Date from the recommended field section.

The system detects that the user has selected the fields Altitude and User Name. The system detects that the user has activated a button labeled "Start Query." The system executes the query by retrieving data associated with the user-selected fields.

4. Field Selection Algorithm

Detailed examples are described below for purposes of clarity. Components and/or operations described below should be understood as specific examples which may not be applicable to certain embodiments. Accordingly, components and/or operations described below should not be construed as limiting the scope of any of the claims.

In an embodiment, the system uses statistical data analysis to select, for recommendation, one or more candidate fields. The system selects the candidate fields based on the presence of the candidate fields in prior queries which also included the user-selected fields associated with the target query. The system identifies prior queries that include the user-selected fields. The system identifies candidate fields $F_1$ which were included in the prior queries in addition to the user-selected fields. For each combination of n user-selected fields $\{F_1, \ldots, F_n\}$, the system analyzes prior query profiles associated with the candidate fields that were entered together with the user-selected fields $\{F_1, \ldots, F_n\}$.

In an embodiment, the system estimates a statistical distribution of each field $F_i$ entered in one or more prior queries which include the combination of fields $\{F_1, \ldots, F_n\}$. Based on the prior query profiles, the system selects, for recommendation, a predetermined number of data fields which have been most strongly correlated with the user-selected fields $\{F_1, \ldots, F_n\}$. As an example, the system may select, for recommendation, the two fields which have most frequently been included in queries together with the user-selected fields $\{F_1, \ldots, F_n\}$. The accuracy and utility of the data fields recommended can be improved by incorporating prior query attributes and/or user attributes into the field selection algorithm.

A. Field Selection Based on Ranking Score

In an embodiment, the system selects a subset of the prior queries based on query attributes and/or user attributes. The system selects a first subset of the prior queries based on an application associated with the target search. The target search is being formulated via CRM software. Accordingly, the system selects a subset of prior queries associated with CRM software. The system selects a second subset of the prior queries, from the first subset of the prior queries, based on a user role. The user formulating the target query is a manager. Accordingly, the system selects a second subset of prior queries that were formulated by a manager and associated with CRM software.

Next, the system analyzes the selected subset of prior query profiles based on the user-selected fields in the target query. The system generates a ranking score for each candidate field based on the prior queries. The target query includes the user-selected fields $(d_1, d_2, d_3)$. The system identifies a set of candidate fields $(d_4, d_5, d_6, d_7, d_8, d_9, d_{10})$ which may be included in a query with the user-selected fields $(d_1, d_2, d_3)$.

Next, the system determines, based on the stored prior query profiles, how many times any data fields from $(d_4, d_5, d_6, d_7, d_8, d_9, d_{10})$ were entered together with the combination of fields $(d_1, d_2, d_3)$. The system further determines how long ago any data fields from $(d_4, d_5, d_6, d_7, d_8, d_9, d_{10})$ were entered together with the combination of fields $(d_1, d_2, d_3)$. Based on how long ago a particular prior query was executed, the system assigns the following weights to the fields comprised in the particular prior query: if the search was created within one year from the current date, then weight w=1, otherwise, the weight w=0.5.

Next, the system determines an update time associated with each data field. If the data field value has been updated within some pre-defined time period, the system adds a constant value to the field ranking score. As an example, the system adds a constant value to the field ranking score if the data field value has been updated within the last month. The constant value may be, for example, the mean value of the ranking scores of the candidate data fields, or any other pre-defined constant. Here, the constant value C=3.

The system has identified the following data corresponding to fields which have been entered together with the field combination ($d_1$, $d_2$, $d_3$):

TABLE 1

| Field | Number of Queries Including Field Executed in Past Year | Number of Queries Including Field Executed Over 1 Year Ago | Last Updated |
|---|---|---|---|
| $d_4$ | 5 | 3 | 1 week ago |
| $d_5$ | 1 | 2 | 1 year ago |
| $d_6$ | 2 | 2 | 1 year ago |
| $d_7$ | 0 | 0 | 2 years ago |
| $d_8$ | 1 | 1 | 1 year ago |
| $d_9$ | 4 | 4 | 1 year ago |
| $d_{10}$ | 0 | 0 | 2 years ago |

Based on the data in Table 1, the system ranks each candidate field using the formula $R(d_i)=1N_1+0.5N_2+C$, where R is the ranking value, $d_i$ is the field being ranked, $N_1$ is the number of queries including the field which were executed in the past year, $N_2$ is the number of queries including the field which were executed over 1 year ago, and C=the update constant. C is set to 3 if the field has been updated within the last month; otherwise, C=0. The system determines the following ranking scores, $R(d_i)$, corresponding to each of the fields listed in Table 1:

$R(d_4)=1N_1+0.5N_2+C=1\times5+0.5\times3+3=9.5$
$R(d_5)=1N_1+0.5N_2+C=1\times1+0.5\times2=2$
$R(d_6)=1N_1+0.5N_2+C=1\times2+0.5\times2=3$
$R(d_7)=1N_1+0.5N_2+C=1\times0+0.5\times0=0$
$R(d_8)=1N_1+0.5N_2+C=1\times1+0.5\times1=1.5$
$R(d_9)=1N_1+0.5N_2+C=1\times4+0.5\times4=6$
$R(d_{10})=1N_1+0.5N_2+C=1\times0+0.5\times0=0$ The system identifies the fields having a ranking score greater than or equal to zero. The system selects the fields, with a ranking score greater than or equal to zero, for recommendation. The system selects the set R of recommended fields: R=($d_4$, $d_9$, $d_6$, $d_5$, $d_8$). Alternatively, or additionally, the system may select a predetermined number of highest-ranked fields for recommendation. As an example, the system generates a ranked list of fields for recommendation, based on the ranking score: (1) $d_4$; (2) $d_9$; and (3) $d_6$.

B. Field Selection Based on Temporary Table

In an embodiment, the system implements a temporary table to compare a target query to a set of prior queries as the user continues to enter fields for formulating the target query.

First, the user has selected field $d_1$ from 10 candidate fields ($d_1$, $d_2$, $d_3$, $d_4$, $d_5$, $d_6$, $d_7$, $d_8$, $d_9$, $d_{10}$) for formulating a query. The selected fields of the target query are shown in Table 2. Because the user has selected the field, $d_1$, a "1" is shown to indicate field $d_1$ has been user-selected. Because the user has not yet selected fields $d_2$-$d_{10}$, but may select additional fields, a "?" is shown to indicate that the field may be, but has not yet been, selected.

The system generates a temporary table including the prior queries which include field $d_1$. The system identifies 1,000 queries which included $d_1$. For simplicity, Table 2 shows the first four queries, ($Q_1$, $Q_2$, $Q_3$, $Q_4$), which included $d_1$. In Tables 2-8, each row corresponds to a query. Each column corresponds to a data field. Entry "1" means that data field has been selected for the corresponding query. Entry "0" means that data field was not selected for the corresponding query.

TABLE 2

|  | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| Target query | 1 | ? | ? | ? | ? | ? | ? | ? | ? | ? |
| $Q_1$ | 1 | 0 | 0 | 1 | 1 | 0 | 1 | 1 | 0 | 0 |
| $Q_2$ | 1 | 0 | 1 | 1 | 0 | 0 | 1 | 0 | 0 | 0 |
| $Q_3$ | 1 | 1 | 1 | 0 | 0 | 1 | 0 | 0 | 1 | 0 |
| $Q_4$ | 1 | 0 | 0 | 0 | 0 | 0 | 0 | 1 | 0 | 0 |

Next, the user selects the additional field $d_2$ for formulating the target query. The system creates a temporary table including the prior queries which included the fields $d_1$ and $d_2$. The system identifies 200 prior queries which included $d_1$ and $d_2$. For simplicity, Table 3 shows the first four queries, ($Q_3$, $Q_{12}$, $Q_{24}$, $Q_{29}$), which included $d_1$ and $d_2$.

TABLE 3

|  | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| Target query | 1 | 1 | ? | ? | ? | ? | ? | ? | ? | ? |
| $Q_3$ | 1 | 1 | 1 | 0 | 0 | 1 | 0 | 0 | 1 | 0 |
| $Q_{12}$ | 1 | 1 | 0 | 1 | 0 | 0 | 0 | 0 | 0 | 0 |
| $Q_{24}$ | 1 | 1 | 0 | 0 | 1 | 1 | 1 | 0 | 0 | 0 |
| $Q_{29}$ | 1 | 1 | 0 | 0 | 0 | 0 | 0 | 1 | 0 | 1 |

Next, the user selects the additional field $d_3$ for formulating the target query. The system creates a temporary table including the prior queries which included the fields $d_1$, $d_2$, and $d_3$. The system identifies 12 queries which included $d_1$, $d_2$, and $d_3$, shown in Table 4.

TABLE 4

|  | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| Target query | 1 | 1 | 1 | ? | ? | ? | ? | ? | ? | ? |
| $Q_3$ | 1 | 1 | 1 | 0 | 0 | 1 | 0 | 0 | 1 | 0 |
| $Q_{52}$ | 1 | 1 | 1 | 1 | 0 | 1 | 0 | 0 | 1 | 0 |
| $Q_{99}$ | 1 | 1 | 1 | 1 | 1 | 0 | 0 | 0 | 1 | 0 |
| $Q_{181}$ | 1 | 1 | 1 | 1 | 0 | 1 | 0 | 1 | 0 | 0 |
| $Q_{294}$ | 1 | 1 | 1 | 0 | 1 | 0 | 0 | 0 | 1 | 0 |
| $Q_{301}$ | 1 | 1 | 1 | 1 | 0 | 0 | 0 | 0 | 0 | 0 |
| $Q_{347}$ | 1 | 1 | 1 | 0 | 0 | 0 | 0 | 0 | 1 | 0 |
| $Q_{465}$ | 1 | 1 | 1 | 1 | 1 | 0 | 0 | 0 | 0 | 0 |
| $Q_{582}$ | 1 | 1 | 1 | 0 | 0 | 0 | 0 | 0 | 1 | 0 |
| $Q_{740}$ | 1 | 1 | 1 | 0 | 0 | 1 | 0 | 0 | 1 | 0 |
| $Q_{885}$ | 1 | 1 | 1 | 1 | 0 | 0 | 0 | 1 | 0 | 0 |
| $Q_{976}$ | 1 | 1 | 1 | 1 | 0 | 0 | 0 | 0 | 1 | 0 |

Next, the system selects a set of candidate fields for recommendation. The system populates the existing table (e.g., Table 4) with weights. A weight is assigned for each candidate field ($d_4$, $d_5$, $d_6$, $d_7$, $d_8$, $d_9$, and $d_{10}$) based on attributes of each of the prior queries. The weights are assigned based on an age of each prior query. If the prior query was formulated within a year prior to the current date, then the weight is set to w=1. If the prior query was formulated over a year prior to the current date, then the weight is set to w=0.5. Table 5 shows the weighted data table.

TABLE 5

|  | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| Target query | 1 | 1 | 1 | ? | ? | ? | ? | ? | ? | ? |

TABLE 5-continued

|  | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| $Q_3$ | 1 | 1 | 1 | 0 | 0 | 0.5 | 0 | 0 | 0.5 | 0 |
| $Q_{52}$ | 1 | 1 | 1 | 1 | 0 | 1 | 0 | 0 | 1 | 0 |
| $Q_{99}$ | 1 | 1 | 1 | 0.5 | 0.5 | 0 | 0 | 0 | 0.5 | 0 |
| $Q_{181}$ | 1 | 1 | 1 | 1 | 0 | 1 | 0 | 0 | 0 | 0 |
| $Q_{294}$ | 1 | 1 | 1 | 0 | 1 | 0 | 0 | 0 | 1 | 0 |
| $Q_{301}$ | 1 | 1 | 1 | 0.5 | 0 | 0 | 0 | 0.5 | 0 | 0 |
| $Q_{347}$ | 1 | 1 | 1 | 0 | 0 | 0 | 0 | 0 | 0.5 | 0 |
| $Q_{465}$ | 1 | 1 | 1 | 0.5 | 0.5 | 0 | 0 | 0 | 0 | 0 |
| $Q_{582}$ | 1 | 1 | 1 | 1 | 0 | 0 | 0 | 0 | 1 | 0 |
| $Q_{740}$ | 1 | 1 | 1 | 0 | 0 | 0.5 | 0 | 0 | 0.5 | 0 |
| $Q_{885}$ | 1 | 1 | 1 | 1 | 0 | 0 | 0 | 1 | 0 | 0 |
| $Q_{976}$ | 1 | 1 | 1 | 1 | 0 | 0 | 0 | 0 | 1 | 0 |

The system computes ranking scores for the candidate fields using the algorithm described in Section 4A. The system sums the weights for each column, and adds the constant (C=3) corresponding to a recent update, if any, for each of the available fields. The ranking scores are as follows:

$R(d_4)=\Sigma W_i+C=1+0.5+1+0.5+0.5+1+1+1+3=9.5$
$R(d_5)=\Sigma W_i+C=0.5+1+0.5+0=2$
$R(d_6)=\Sigma W_i+C=0.5+1+1+0.5+0=3$
$R(d_7)=\Sigma W_i+C=0+0=0$
$R(d_8)=\Sigma W_i+C=0.5+1+0=1.5$
$R(d_9)=\Sigma W_i+C=0.5+1+0.5+1+0.5+1+0.5+1=6$
$R(d_{10})=\Sigma W_i+C=0+0+0=0$ The system selects the two data fields with the highest ranking scores $R(d_i)$. In this case, the highest-ranked fields are $d_4$ and $d_9$. The system recommends $d_4$ and $d_9$ to the user.

The system detects that the user has selected $d_4$, but did not select $d_9$. Based on the user selection of field $d_4$, the system adds $d_4$ to the set of user-selected fields for formulating the target query. Since the user rejected the recommendation of field $d_9$, the system removes $d_9$ from consideration for further recommendations. Table 6 shows the temporary table, adjusted to reflect the user input accepting the recommended field $d_4$ and rejecting the recommended field $d_9$. Column $d_9$ has been removed from the table. Column $d_4$ has been adjusted to reflect the user selection of field $d_4$. The system updates the temporary table to include only those prior queries which include the four user-selected fields ($d_1$, $d_2$, $d_3$, and $d_4$). The system populates the table with weights for the candidate fields ($d_5$, $d_6$, $d_7$, $d_8$, and $d_{10}$).

TABLE 6

|  | $d_1$ | $d_2$ | $d_3$ | $d_4$ | $d_5$ | $d_6$ | $d_7$ | $d_8$ | $d_{10}$ |
|---|---|---|---|---|---|---|---|---|---|
| Target query | 1 | 1 | 1 | 1 | ? | ? | ? | ? | ? |
| $Q_{52}$ | 1 | 1 | 1 | 1 | 0 | 1 | 0 | 0 | 0 |
| $Q_{99}$ | 1 | 1 | 1 | 1 | 0.5 | 0 | 0 | 0 | 0 |
| $Q_{181}$ | 1 | 1 | 1 | 1 | 0 | 1 | 0 | 0 | 0 |
| $Q_{301}$ | 1 | 1 | 1 | 1 | 0 | 0 | 0 | 0.5 | 0 |
| $Q_{465}$ | 1 | 1 | 1 | 1 | 0.5 | 0 | 0 | 0 | 0 |
| $Q_{582}$ | 1 | 1 | 1 | 1 | 0 | 0 | 0 | 0 | 0 |
| $Q_{885}$ | 1 | 1 | 1 | 1 | 0 | 0 | 0 | 1 | 0 |
| $Q_{976}$ | 1 | 1 | 1 | 1 | 0 | 0 | 0 | 0 | 0 |

The system computes ranking scores for each of the candidate fields ($d_5$, $d_6$, $d_7$, $d_8$, and $d_{10}$). The system computes the ranking scores by summing up the weights for each column, and adding the constant corresponding to a recent update, if any, for each of the available fields. The ranking scores are as follows:

$R(d_5)=\Sigma W_i+C=0.5+0.5+0=1$
$R(d_6)=\Sigma W_i+C=1+1+0=2$
$R(d_7)=\Sigma W_i+C=0+0+0=0$
$R(d_8)=\Sigma W_i+C=0.5+1+0=1.5$
$R(d_{10})=\Sigma W_i+C=0+0+0=0$ Based on the ranking scores R, the system recommends the two highest-ranked data fields to the user. At this point, the two highest-ranked data fields are $d_6$ and $d_8$. Accordingly, the system recommends data fields $d_6$ and $d_8$ to the user.

The system may continue to update the temporary table and the ranking scores as the user selects additional fields. The system may continue to recommend the two-highest ranked fields based on the additional user-selected fields.

C. Field Selection Based on Filtered Prior Query Profiles

In an embodiment, the operations detailed above in Section 4B may be applied to a filtered set of prior query profiles. The system may select the aggregate log data of prior query profiles which were formulated by a tenant in a multi-tenant cloud architecture. The system may select the aggregate log data of prior query profiles which were formulated by multiple tenants in a multi-tenant cloud architecture. Alternatively, or additionally, the system may filter prior query profiles by a hierarchical condition. As an example, the hierarchical condition is Application→User Role→Search Quarter. The system selects a first subset of prior query profiles for which the query was configured in association with a same application as an application associated with the target query. Next, using the first subset of prior query profiles, the system selects a second subset of prior query profiles for which the query was formulated by a user with a same user role as the user role of the user formulating the target query. Next, using the second subset of prior query profiles, the system selects a third subset of prior query profiles for which the query was formulated in a same quarter of the year as the quarter of the year in which the target query was formulated. The system then creates a temporary table comprising the third subset of prior query profiles.

As an example, a user selects N fields for formulating a query ($d_1$, $d_2$, and $d_3$). The system identifies no prior query profiles, of the third subset of filtered prior query profiles, which include the N fields. The target search is unique. Accordingly, the temporary table contains no records.

In this case, the system can generate a recommendation by analyzing prior queries with at least one of the N fields. The system generates a temporary table (Table 7, below). The temporary table includes prior queries that include at least one of the user-selected fields ($d_1$, $d_2$, $d_3$). The candidate fields ($d_4$, $d_5$, $d_6$, $d_7$, $d_8$, $d_9$, $d_{10}$) have been updated more than 1 month ago (C=0). Based on a recency of each prior query, the system populates the table with weights.

TABLE 7

|  | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| Target query | 1 | 1 | 1 | ? | ? | ? | ? | ? | ? | ? |
| $Q_6$ | 1 | 1 | 0 | 0 | 0 | 0.5 | 0 | 0 | 0.5 | 0.5 |
| $Q_{22}$ | 1 | 1 | 0 | 0 | 1 | 1 | 1 | 0 | 1 | 0 |
| $Q_{39}$ | 1 | 0 | 1 | 0 | 0.5 | 0 | 0 | 0 | 0.5 | 0 |
| $Q_{79}$ | 0 | 1 | 1 | 0 | 1 | 1 | 0 | 0 | 0 | 0 |
| $Q_{93}$ | 1 | 0 | 1 | 0 | 0 | 0 | 0 | 0 | 1 | 0 |
| $Q_{114}$ | 1 | 0 | 1 | 0 | 0 | 0 | 0.5 | 0.5 | 0 | 0 |
| $Q_{145}$ | 1 | 1 | 0 | 0 | 0 | 0 | 0 | 0 | 0.5 | 0.5 |
| $Q_{156}$ | 0 | 1 | 1 | 0.5 | 0.5 | 0 | 0 | 0 | 0 | 0 |
| $Q_{167}$ | 0 | 1 | 1 | 1 | 1 | 0 | 0 | 0 | 1 | 0 |

TABLE 7-continued

|       | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| $Q_{180}$ | 1 | 0 | 1 | 0 | 0 | 0.5 | 0 | 0 | 0.5 | 0 |
| $Q_{222}$ | 0 | 0 | 1 | 1 | 0.5 | 0 | 0 | 1 | 0 | 0 |
| $Q_{245}$ | 0 | 1 | 0 | 0 | 0 | 1 | 0 | 0 | 0 | 0.5 |
| $Q_{301}$ | 0 | 0 | 1 | 0 | 0 | 0.5 | 1 | 0.5 | 0 | 0 |

The system represents each query in Table 7 as a vector $V_Q=(\delta(d_1), \delta(d_2), d(d_3))$. Each element $\delta(d_i)$ of the vector $V_Q$ is equal to 1 if the corresponding data field has been selected, and equal to 0 if the corresponding data field has not been selected. Hence, as the target query includes the three data fields ($d_1$, $d_2$, $d_3$), the target query is represented by the vector $V_T=(1, 1, 1)$.

The system generates vectors for the prior queries as follows:

$V_6=(1, 1, 0)$
$V_{22}=(1, 1, 0)$
$V_{39}=(1, 0, 1)$
$V_{79}=(0, 1, 1)$
$V_{93}=(1, 0, 1)$
$V_{114}=(1, 0, 1)$
$V_{145}=(1, 1, 0)$
$V_{156}=(0, 1, 1)$
$V_{167}=(0, 1, 1)$
$V_{180}=(1, 0, 1)$
$V_{222}=(0, 0, 1)$
$V_{245}=(0, 1, 0)$
$V_{301}=(0, 0, 1)$

The system uses the K-nearest-neighbor algorithm to select some number K of queries for further analysis. The system selects K query vectors from the temporary table based on a distance metric. The distance metric is obtained via a comparison of the target query vector $V_T=(1, 1, 1)$, and $V_i$ corresponding to each of the prior queries. The system populates the temporary table with weights for the candidate fields ($d_4$, $d_5$, $d_6$, $d_7$, $d_8$, $d_9$, $d_{10}$), for the rows corresponding to the K closest query vectors. For the query vectors which are not found to be the K closest, the system may set the weights to zero or omit the corresponding rows. Here, K=10, and the adjusted table is shown in Table 8.

TABLE 8

|       | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| Target query | 1 | 1 | 1 | ? | ? | ? | ? | ? | ? | ? |
| $Q_6$ | 1 | 1 | 0 | 0 | 0 | 0.5 | 0 | 0 | 0.5 | 0.5 |
| $Q_{22}$ | 1 | 1 | 0 | 0 | 1 | 1 | 1 | 0 | 1 | 0 |
| $Q_{39}$ | 1 | 0 | 1 | 0 | 0.5 | 0 | 0 | 0 | 0.5 | 0 |
| $Q_{79}$ | 0 | 1 | 1 | 0 | 1 | 1 | 0 | 0 | 0 | 0 |
| $Q_{93}$ | 1 | 0 | 1 | 0 | 0 | 0 | 0 | 0 | 1 | 0 |
| $Q_{114}$ | 1 | 0 | 1 | 0 | 0 | 0 | 0.5 | 0.5 | 0 | 0 |
| $Q_{145}$ | 1 | 1 | 0 | 0 | 0 | 0 | 0 | 0 | 0.5 | 0.5 |
| $Q_{156}$ | 0 | 1 | 1 | 0.5 | 0.5 | 0 | 0 | 0 | 0 | 0 |
| $Q_{167}$ | 0 | 1 | 1 | 1 | 1 | 0 | 0 | 0 | 1 | 0 |
| $Q_{180}$ | 1 | 0 | 1 | 0 | 0 | 0.5 | 0 | 0 | 0.5 | 0 |

Next, the system sums the weights, for each candidate field, to calculate a ranking score for each candidate field. The ranking scores are as follows:

$R(d_4)=\Sigma W_i+C=0.5+1+0=1.5$
$R(d_5)=\Sigma W_i+C=1+0.5+1+0.5+1+0=4.0$
$R(d_6)=\Sigma W_i+C=0.5+1+1+0.5+0=3.0$
$R(d_7)=\Sigma W_i+C=0.5+0.5+0=1.5$
$R(d_8)=\Sigma W_i+C=0.5+0=0.5$
$R(d_9)=\Sigma W_i+C=0.5+1+0.5+1+0.5+1+0.5+0=5.0$
$R(d_{10})=\Sigma W_i+C=0.5+0.5+0=1.0$ Based on the ranking scores R, the system recommends the two highest-ranked data fields to the user. The two highest-ranked data fields are $d_9$ and $d_5$. Accordingly, the system recommends data fields $d_9$ and $d_5$ to the user.

5. Query Interface

Figure 3B:
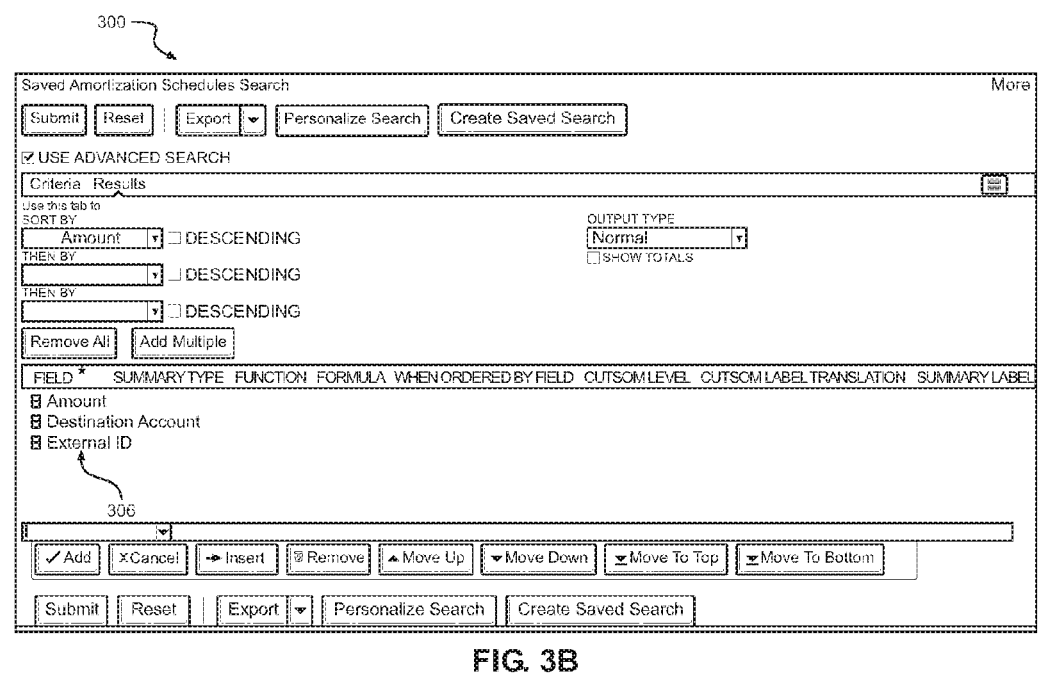
Figure 3C:
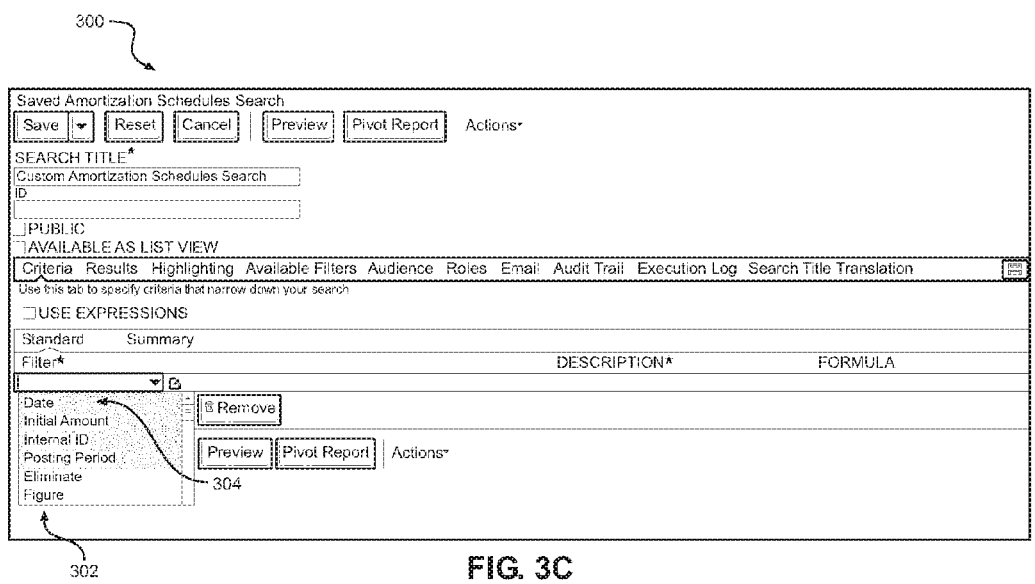

FIGS. 3A-3E illustrate a query interface in accordance with one or more embodiments. One or more components of the query interface as illustrated in FIG. 3A-3B may be modified, rearranged, or omitted altogether. Accordingly, the interface components illustrated in FIGS. 3A-3E should not be construed as limiting the scope of one or more embodiments.

FIG. 3A illustrates a query interface 300 for formulating a query related to an amortization schedule. The query interface 300 displays a series of candidate fields 302 via a drop-down menu. The candidate fields 302 are displayed alphabetically. The first few candidate fields, as shown in FIG. 3A, are: Amount, Date, Destination Account, Eliminate, External ID, and External ID (Text).

FIG. 3B shows the query interface, after the user has selected three fields. The query interface 300 displays the user-selected fields 306 Amount, Destination Account, and External ID. Based on the user-selected fields, the system identifies four fields to recommend to the user.

FIG. 3C shows the query interface 300 with the four recommended fields 304 presented to the user. The recommended fields are Date, Initial Amount, Internal ID, and Posting Period. The system presents the recommended fields by displaying the recommended fields at the top of the list of candidate fields. Further, the recommended fields are highlighted. Below the recommended fields 304, the remaining candidate fields 302 are displayed alphabetically. FIG. 3B shows the first two remaining candidate fields, Eliminate and Figure. The query interface also lists selected several additional candidate fields (not shown), which are accessible via a scroll bar. The user-selected fields 306 Amount, Destination Account, and External ID are no longer displayed. The user selects the four recommended fields, along with several other fields from the alphabetical list of candidate fields.

Figure 3D:
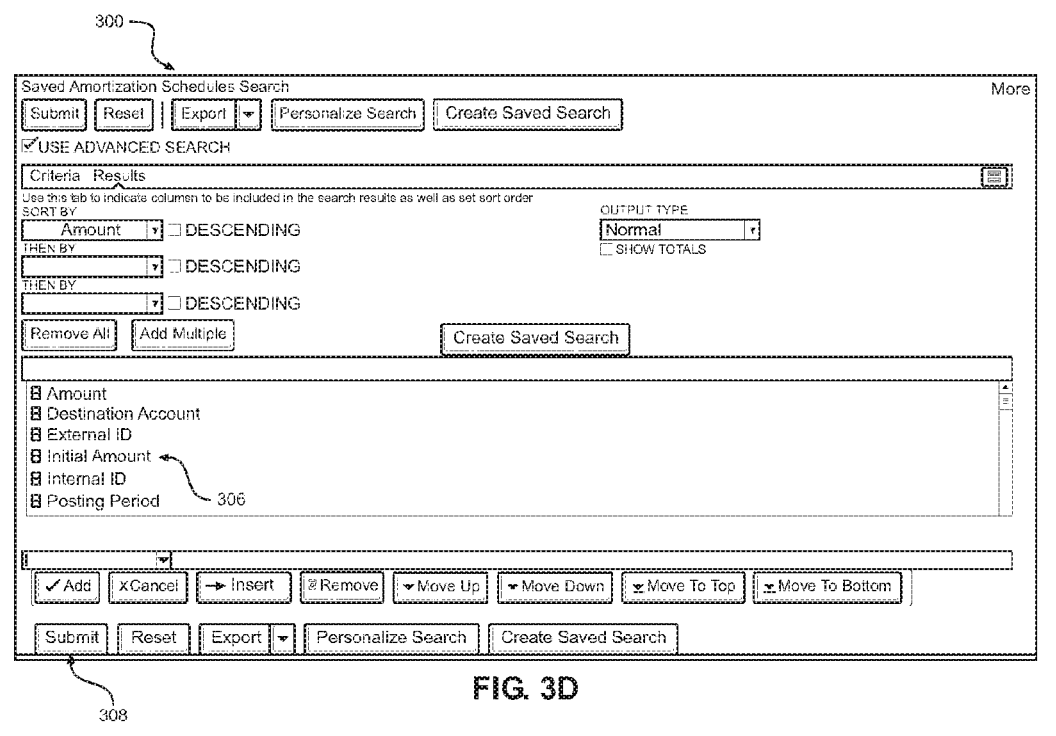

FIG. 3D shows the query interface, after the user has selected additional fields based on the recommended fields. The query interface 300 displays the original set of three user-selected fields 306 Amount, Destination Account, and External ID. Additionally, the query interface 300 displays the user-selected recommended fields Date, Initial Amount, Internal ID, and Posting Period. The query interface also lists selected several additional user-selected fields (not shown), which are accessible via a scroll bar. The user clicks the Submit button 308 to direct the system to execute the query. The system executes the query.

Figure 3E:
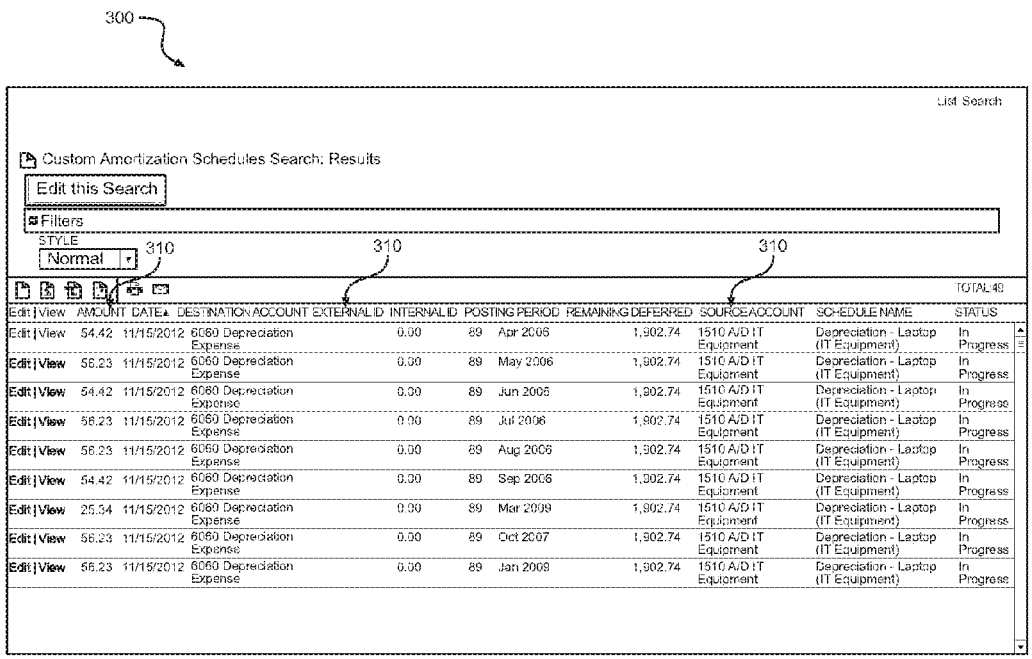

FIG. 3E shows the query interface displaying the results of the query. The query results are displayed via a set of columns 310, corresponding to the user-selected fields. The first column corresponds to the first user-selected field, Amount. The remaining columns correspond to the remaining user-selected fields. The system displays records corresponding to each of the user-selected fields.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422.

For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
receiving a set of one or more user-selected fields, selected by a user from a plurality of candidate fields, for formulating a query;
based at least on the set of one or more user-selected fields:
selecting at least one candidate field from the plurality of candidate fields;
recommending the at least one candidate field for selection by the user for formulating the query;
receiving a user selection of the at least one candidate field recommended for formulating the query;
adding the at least one candidate field to the set of user-selected fields to obtain an updated set of user-selected fields for formulating the query;
receiving, for each field in the updated set of user-selected fields, a corresponding value; and
executing the query based on the received values of the updated set of user-selected fields to obtain a plurality of results.

2. The medium of claim 1, wherein the selecting the at least one candidate field for recommendation is based, at least in part, on a set of one or more prior queries.

3. The medium of claim 2, wherein the selecting the at least one candidate field for recommendation is based, at least in part, on a recency of one or more prior queries of the set of one or more prior queries.

4. The medium of claim 2, wherein the selecting the at least one candidate field for recommendation is based, at least in part, on a comparison of the set of user-selected fields and the set of one or more prior queries.

5. The medium of claim 2, wherein the selecting the at least one candidate field for recommendation is based, at least in part, on a comparison of a user formulating the set of one or more prior queries and the user formulating the query.

6. The medium of claim 1, wherein the selecting the at least one candidate field for recommendation is based, at least in part, on an update time of the at least one candidate field.

7. The medium of claim 1, wherein the selecting the at least one candidate field for recommendation is based, at least in part, on a role of the user formulating the query.

8. The medium of claim 1, wherein the selecting the at least one candidate field for recommendation is based, at least in part, on a time of formulating the query.

9. The medium of claim 1, wherein the selecting the at least one candidate field for recommendation is based, at least in part, on an industry related to the query.

10. The medium of claim 1, wherein the selecting the at least one candidate field for recommendation is based, at least in part, on an application type related to the query.

11. The medium of claim 1, wherein the operations further comprise:
identifying a set of one or more prior queries comprising one or more fields of the set of user-selected fields;
identifying a plurality of additional fields, which are not included in the set of user-selected fields, comprised in the set of one or more prior queries;
assigning a ranking to each additional field of the plurality of additional fields; and
based on the plurality of ranked additional fields, selecting a subset of the plurality of ranked additional fields as the at least one candidate field.

12. The medium of claim 11, wherein a predetermined number of highest-ranked fields are selected as the at least one candidate field.

13. The medium of claim 11, wherein the ranking is assigned based on a recency of each prior query in the set of one or more prior queries.

14. The medium of claim 1, wherein the recommending the at least one candidate field comprises displaying the at least one recommended candidate field in a prioritized position in a list of candidate fields.

15. The medium of claim 1, wherein the recommending the at least one candidate field comprises displaying the at least one recommended candidate field in a separate area from an area in which other fields are displayed.

16. The medium of claim 1, wherein the recommending the at least one candidate field comprises displaying the at least one recommended candidate field in a different color than a color in which other fields are displayed.

17. The medium of claim 1, wherein the operations further comprise:

receiving additional user-selected fields;
re-evaluating and updating the at least one candidate field selected for recommendation based on the additional user-selected fields; and
recommending the updated at least one candidate field for selection by the user for formulating the query.

18. The medium of claim 1, wherein the operations further comprise:
identifying one or more fields of the at least one recommended candidate field, not selected by the user; and
refraining from recommending the one or more fields not selected by the user.

19. The medium of claim 1, wherein the plurality of candidate fields comprise fields of a relational database.

20. The medium of claim 1, wherein the plurality of candidate fields comprise a corresponding plurality of columns of a relational database.

21. A method comprising:
receiving a set of one or more user-selected fields, selected by a user from a plurality of candidate fields, for formulating a query;
based at least on the set of one or more user-selected fields:
selecting at least one candidate field from the plurality of candidate fields;
recommending the at least one candidate field for selection by the user for formulating the query;
receiving a user selection of the at least one candidate field recommended for formulating the query;
adding the at least one candidate field to the set of user-selected fields to obtain an updated set of user-selected fields for formulating the query;
receiving, for each field in the updated set of user-selected fields, a corresponding value; and
executing the query based on the received values of the updated set of user-selected fields to obtain a plurality of results,
wherein the method is performed by at least one device including a hardware processor.

22. A system comprising:
at least one device including a hardware processor; the system configured to perform operations comprising:
receiving a set of one or more user-selected fields, selected by a user from a plurality of candidate fields, for formulating a query;
based at least on the set of one or more user-selected fields:
selecting at least one candidate field from the plurality of candidate fields;
recommending the at least one candidate field for selection by the user for formulating the query;
receiving a user selection of the at least one candidate field recommended for formulating the query;
adding the at least one candidate field to the set of user-selected fields to obtain an updated set of user-selected fields for formulating the query;
receiving, for each field in the updated set of user-selected fields, a corresponding value; and
executing the query based on the received values of the updated set of user-selected fields to obtain a plurality of results.

\* \* \* \* \*